United States Patent
Choi et al.

(10) Patent No.: US 11,119,212 B2
(45) Date of Patent: Sep. 14, 2021

(54) SYSTEM AND METHOD TO REDUCE DVE EFFECT ON LIDAR RETURN

(71) Applicant: Aurora Flight Sciences Corporation, Manassas, VA (US)

(72) Inventors: Jae-Woo Choi, Lexington, MA (US); James D. Paduano, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 501 days.

(21) Appl. No.: 16/101,059

(22) Filed: Aug. 10, 2018

(65) Prior Publication Data

US 2020/0049820 A1  Feb. 13, 2020

(51) Int. Cl.
| | | |
|---|---|---|
| *G01S 17/08* | (2006.01) | |
| *G02B 27/10* | (2006.01) | |
| *G01S 17/89* | (2020.01) | |
| *G01S 7/481* | (2006.01) | |

(52) U.S. Cl.
CPC ............. *G01S 17/08* (2013.01); *G01S 7/4811* (2013.01); *G01S 7/4817* (2013.01); *G01S 17/89* (2013.01); *G02B 27/10* (2013.01)

(58) Field of Classification Search
None
See application file for complete search history.

(56) References Cited

U.S. PATENT DOCUMENTS

| | | |
|---|---|---|
| 6,064,924 A | 5/2000 | Fleischmann |
| 6,268,803 B1 | 7/2001 | Gunderson et al. |
| 6,670,910 B2 | 12/2003 | Delcheccolo et al. |
| 6,678,210 B2 | 1/2004 | Rowe |
| 6,975,246 B1 | 12/2005 | Trudeau |
| 7,136,011 B2 | 11/2006 | Mork et al. |

(Continued)

FOREIGN PATENT DOCUMENTS

| | | |
|---|---|---|
| EP | 1340999 | 9/2003 |
| EP | 2042963 | 4/2009 |

(Continued)

OTHER PUBLICATIONS

Jesacher "Wavefront correction of spatial light modulators using an optical vortex image", Apr. 30, 2007 /vol. 15, No. 9/ Optics Express 5801 (Year: 2007).*

(Continued)

*Primary Examiner* — Hovhannes Baghdasaryan
(74) *Attorney, Agent, or Firm* — Michael Stanley Tomsa; McAndrews, Held & Malloy, Ltd.; Eugene H. Nahm

(57) ABSTRACT

A LIDAR system for vehicle operation that can operate in degraded visual environments (DVE) is described. The LIDAR system may use a spatial light modulator to find the phase conjugate of the DVE being traversed by the laser beam and cancel out the backscatter from the DVE, which allows the detection of extremely small numbers of directly reflected photons reflected by a target surface. If the target is not detected, the LIDAR is iteratively scanned to its maximum available depth of focus until the target is acquired. The LIDAR system is especially useful for autonomous landing of VTOL aerial vehicles in locations where the target landing spot is approximately known but cannot be directly visualized due to DVE media, such as smoke, dust, fog, or the like.

20 Claims, 5 Drawing Sheets

(56) References Cited

U.S. PATENT DOCUMENTS

| | | |
|---|---|---|
| 7,194,358 B2 | 3/2007 | Callaghan et al. |
| 7,369,460 B2 | 5/2008 | Chiappetta et al. |
| 7,443,154 B1 | 10/2008 | Merewether et al. |
| 7,725,258 B2 | 5/2010 | Smitherman |
| 7,751,976 B2 | 7/2010 | Matuska et al. |
| 7,791,529 B2 | 9/2010 | Filias et al. |
| 7,982,662 B2 | 7/2011 | Shaffer |
| 8,467,953 B2 | 6/2013 | Naderhirn |
| 8,500,067 B2 | 8/2013 | Woodworth et al. |
| 8,543,265 B2 | 9/2013 | Ekhaguere et al. |
| 8,970,401 B2 | 3/2015 | Molander et al. |
| 2003/0043058 A1 | 3/2003 | Jamieson et al. |
| 2005/0004723 A1 | 1/2005 | Duggan et al. |
| 2005/0109872 A1 | 5/2005 | Voos et al. |
| 2005/0271221 A1 | 12/2005 | Cerwin |
| 2007/0030542 A1 | 2/2007 | Grasso |
| 2007/0046448 A1 | 3/2007 | Smitherman |
| 2007/0195646 A1 | 8/2007 | Govindswamy et al. |
| 2007/0210953 A1 | 9/2007 | Abraham et al. |
| 2008/0027591 A1 | 1/2008 | Lenser et al. |
| 2008/0269966 A1 | 10/2008 | Markiton et al. |
| 2009/0140885 A1 | 6/2009 | Rogers et al. |
| 2009/0164122 A1 | 6/2009 | Morbey et al. |
| 2009/0201763 A1 | 8/2009 | Jones et al. |
| 2009/0306840 A1 | 12/2009 | Blenkhorn et al. |
| 2010/0057278 A1 | 3/2010 | Lee |
| 2010/0228408 A1 | 9/2010 | Ford et al. |
| 2010/0256909 A1 | 10/2010 | Duggan et al. |
| 2010/0292871 A1 | 11/2010 | Schultz et al. |
| 2011/0066307 A1 | 3/2011 | Hiebl |
| 2011/0160941 A1 | 6/2011 | Garrec et al. |
| 2011/0307126 A1 | 12/2011 | Hogstrom |
| 2012/0130566 A1 | 5/2012 | Anderson |
| 2012/0158222 A1 | 6/2012 | Ehlin et al. |
| 2012/0199698 A1 | 8/2012 | Thomasson et al. |
| 2012/0253582 A1 | 10/2012 | Chrysanthakopoulos et al. |
| 2012/0293987 A1 | 11/2012 | Espedal et al. |
| 2013/0001366 A1 | 1/2013 | Wolff et al. |
| 2013/0044309 A1* | 2/2013 | Dakin .................. G01S 7/4814 356/4.09 |
| 2013/0110323 A1 | 5/2013 | Knight |
| 2013/0120164 A1 | 5/2013 | Greene et al. |
| 2013/0151203 A1 | 6/2013 | McEwen-King et al. |
| 2013/0325245 A1 | 12/2013 | Kolcarek et al. |
| 2013/0332062 A1 | 12/2013 | Kreitmair-Steck et al. |
| 2014/0012434 A1 | 1/2014 | Spence et al. |
| 2014/0268096 A1 | 9/2014 | Lebow et al. |
| 2015/0323932 A1 | 11/2015 | Paduano |
| 2017/0212407 A1* | 7/2017 | Hunt .................... G01S 7/4816 |

FOREIGN PATENT DOCUMENTS

| | | |
|---|---|---|
| EP | 2177966 | 4/2010 |
| EP | 2182419 | 5/2010 |
| EP | 2287633 | 2/2011 |
| EP | 2515147 | 10/2012 |
| KR | 20100081759 | 7/2010 |
| WO | 2007086055 | 8/2007 |
| WO | 2014/064431 | 5/2014 |

OTHER PUBLICATIONS

Extended European search report, dated Dec. 11, 2019, in application No. EP 19191058.7.

David N. Lee, et al., Common principle of guidance by echolocation and vision, J Comp Physiol A (1992) 171:563-571.

F. Ruffier et al., Bio-Inspired Optical Flow Circuits for the Visual Guidance of Micro-Air Vehicles, IEEE 2003.

F. Ruffier, et al., Combining sound and optic flow cues to reach a sound source despite lateral obstacles, IEEE 2008.

Geoffrey Portelli, et al., A 3D Insect-Inspired Visual Autopilot for Corridor-Following, Proceedings of the 2nd Biennial IEEE/RAS-EMBS International Conference on Biomedical Robotics and Biomechatronics, Scottsdale, AZ, USA, Oct. 19-22, 2008.

G. Warwick, Bat-Inspired Tech to Aid Flight Along Streets, Aviation Week's DTI, Oct. 27, 2008.

Maryland Robotics Center, Horiuchi, Humbert Developing Bio-Inspired Navigation for Micro Air Vehicles, Oct. 29, 2008.

Liu, J., Xiao, Y., Hao, Q., and Ghaboosi, K., Bio-inspired Visual Attention in Agile Sensing for Target Detection, International Journal of Sensor Networks vol. 5, No. 2, Jan. 2009.

Frédéric L. Roubieu, et al., A novel 1-gram insect based device measuring visual motion along 5 optical directions, IEEE 2011.

Franck Ruffier, et al., A tiny directional sound sensor inspired by crickets designed for Micro-Air Vehicles, IEEE 2011.

Junliang Tao, et al., Bio-inspired Flow and Acoustic Sensor; Proc. of SPIE vol. 8019 80190R-1, 2011.

Jong Jin Park, et aL, abstract of "Giant Acoustic Concentration by Extraordinary Transmission in Zero Mass Metamatrials," Phys. Rev. Lett. 110, 244302 (published Jun. 13, 2013).

Transmittal; International Search Report; and Written Opinion of the International Searching Authority for International Application No. PCT/US2015/030099 dated Aug. 17, 2015.

D. B. Conkey, A. M. Caravaca-Aguirre, and R. Piestun, "High-speed scattering medium characterization with application to focusing light through turbid," Jan. 16, 2012 / vol. 20, No. 2 / Optics Express 1733-1740.

J. R. Fienup, "Phase retrieval algorithms: a comparison," Applied Optics / vol. 21, No. 15 / 2758-2658 /Aug. 1, 1982.

Z. Yaqoob, D. Psaltis, M. S. Feld, and C. Yang, "Optical Phase Conjugation for Turbidity Suppression in Biological Samples," Nat Photonics. 2008 ; 2(2): 110-115. doi:10.1038/nphoton.2007.297.

J. Lim, A. Goy, M. H. Shoreh, M. Unser, and D. Psaltis, "Learning Tomography Assessed Using Mie Theory," Physical Review Applied 9, 034027 (2018).

X. Yang, Y. Pu, and D. Psaltis, "Imaging blood cells through scattering biological tissue using speckle scanning microscopy," Feb. 10, 2014 | vol. 22, No. 3 | DOI:10.1364/OE.22.003405 | Optics Express 3405-3413.

\* cited by examiner

SYSTEM AND METHOD TO REDUCE DVE EFFECT ON LIDAR RETURN

FIELD

The present disclosure relates to the field of flight control systems, methods, and apparatuses; even more particularly, to systems, methods, and apparatuses for sensing terrain or obstacles in flight in degraded visual environments (DVE). In one aspect, the disclosure describes new and novel systems and methods for applying LIDAR with a spatial light modulator (SLM) to match the emitted light profile adaptively to the backscatter from the DVE, thereby improving the signal return from the terrain or obstacle of interest and allowing detection at longer ranges in DVEs.

BACKGROUND

LIDAR, sometimes referred to as "lidar," "LiDAR," or a "laser scanner," is a combination of the words "light" and "radar," but also can be considered an acronym for "Light Detection and Ranging" or "Light Imaging, Detection, and Ranging." LIDAR generally refers to a ranging technique where a laser beam is aimed at a target and the reflected return of the laser beam is measured to determine distance to that target. By scanning the laser beam, returns can be compiled into accurate 3D models of the environment. LIDAR is useful in aviation both for generating accurate 3D maps of terrain for future use (e.g., mapping), and for real time terrain and object detection for collision avoidance.

Objects of interest are relatively poor reflectors of coherent light beams, such as a laser beam; therefore the light return to the LIDAR instrument may be in the form of scattered reflections, often called "backscatter." Scattered light that makes its way back to the detector of the LIDAR instrument indicates a return from a target. Because clear air scatters the laser light much less than solid surfaces, the time of arrival of a peak in the backscatter energy can be used to determine a distance to the target toward which the LIDAR is aimed. Light that takes an indirect path, typically because it is reflected by interaction with molecules in the air (whether on the way to or from the target), interferes with the direct path response to the target. Nevertheless, in clear air LIDAR works very well and can be used to make high resolution images of a surface at relatively long ranges.

LIDAR's accuracy is degraded, however, when the air or "medium" contains additional media, such as molecules of smoke, water, dust, or the like, which tend to further scatter light at the frequency of the laser being used. Thus, conditions such as rain, dust, heavy pollution, or fog, that cause a degraded visual environment (DVE), also significantly reduce the effective range of LIDAR, because the background level of backscatter returns increases rapidly with distance through the DVE to the point where the backscatter from the media cannot be distinguished from photons reflected by the target, both because the background backscatter is greatly increased and the amount of laser illumination that can be reflected by the target is greatly reduced by the round trip of the laser beam through the medium. For real-time scenarios, such as the operation of autonomous aerial vehicles that must land in a DVE, or pilot visualization aids in DVE situations, this loss of capability presents an obstacle to sustaining operations in DVE environments.

Thus, a need exists for a LIDAR system that will continue to perform in DVE environments with better object detection and resolution than is achieved with current techniques for overcoming DVE in LIDAR.

SUMMARY

The present disclosure describes, inter alia, a light focusing through degraded visual environment (LIFT-DVE) LIDAR system that will enable greater mission capabilities in DVEs, such as rain, brown-out, low light, and similar conditions. For example, a LIDAR system may include a spatial light modulator (SLM) at the light source that corrects the emitted laser wave front to decrease the impact of the scattering media in a DVE and allowing visualization of target objects in or beyond the DVE.

According to a first aspect, a LIDAR system for an aerial vehicle operating in a degraded visual environment (DVE) comprises: a laser source configured to emit a coherent light beam; a spatial light modulator to modulate said coherent light beam, wherein the spatial light modulator is configured to phase conjugate an interference pattern of a DVE medium that is positioned between said spatial light modulator and a target; an optical lens to filter said coherent light beam from the spatial light modulator, wherein the optical lens is configured to direct the coherent light beam toward the target, wherein the coherent light beam reflects off of the DVE medium to yield scattered photons and reflects off of the target to yield reflected photons; a second optical lens to collect the scattered photons and the reflected photons; and a detector array to detect the scattered photons and the reflected photons.

In certain aspects, the LIDAR system is configured to iteratively scan a plurality of conjugates to identify a current scattering property of said DVE medium.

In certain aspects, the LIDAR iteratively scans all possible conjugates to identify a current scattering state of said DVE medium.

In certain aspects, the step for iteratively scanning the plurality of conjugates uses a Fienup reconstruction technique.

In certain aspects, the LIDAR system is configured to probe at successively longer presumed ranges until a predetermined time for a scan exceeds a decorrelation time of said DVE medium at a presumed distance.

In certain aspects, the laser source is configured to emit the coherent light beam via an optical phase array.

In certain aspects, the detector array is a single photon avalanche diode (SPAD) array.

In certain aspects, the detector array and the spatial light modulator are each operatively coupled to a digital signal processor, wherein the digital signal processor is configured to communicate with a flight control system of the aerial vehicle.

In certain aspects, the flight control system is configured to identify a landing zone as a function of data received from the LIDAR system via the digital signal processor.

In certain aspects, the optical lens includes a beam splitter to create a reference beam to which the scattered photons or the reflected photons can be compared.

In certain aspects, the digital signal processor is configured to track a position and pose of the aerial vehicle as the aerial vehicle navigates through the DVE medium.

In certain aspects, the digital signal processor is configured to track the position and pose based at least in part on information received from the flight control system.

According to a second aspect, a method of operating a LIDAR system of an aerial vehicle operating in a degraded visual environment (DVE) comprises the steps of: emitting a coherent light beam from a laser source; modulating said coherent light beam via a spatial light modulator, wherein the spatial light modulator is configured to phase conjugate an interference pattern of a DVE medium that is positioned between said spatial light modulator and a target; filtering said coherent light beam from the spatial light modulator via an optical lens; directing the coherent light beam toward the target, wherein the coherent light beam reflects off of the DVE medium to yield scattered photons and reflects off of the target to yield reflected photons; collecting the scattered photons and the reflected photons via a second optical lens; and detecting the scattered photons and the reflected photons via a detector array.

In certain aspects, the method further comprises the step of iteratively scanning a plurality of conjugates to identify a current scattering property of said DVE medium.

In certain aspects, the method further comprises the step of iteratively scanning all possible conjugates to identify a current scattering property of said DVE medium.

In certain aspects, the step for iteratively scanning the plurality of conjugates uses a Fienup reconstruction technique.

In certain aspects, the method further comprises the step of probing at successively longer presumed ranges until a predetermined time for a scan exceeds a decorrelation time of said DVE medium at a presumed distance.

In certain aspects, the laser source is configured to emit the coherent light beam via an optical phase array.

In certain aspects, the detector array is a single photon avalanche diode (SPAD) array.

In certain aspects, the detector array and the spatial light modulator are each operatively coupled to a digital signal processor, wherein the digital signal processor is configured to communicate with a flight control system of the aerial vehicle.

In certain aspects, the method further comprises the step of identifying a landing zone as a function of data received from the LIDAR system via the digital signal processor.

In certain aspects, the optical lens includes a beam splitter to create a reference beam and the method further comprises the step of comparing the reference beam to the scattered photons or the reflected photons.

In certain aspects, the method further comprises the step of tracking a position and pose of the aerial vehicle as the aerial vehicle navigates through the DVE medium.

In certain aspects, the tracking of the position and pose is based at least in part on information received from the flight control system.

According to a third aspect, a LIDAR system for an aerial vehicle operating in a degraded visual environment (DVE) comprises: a digital signal processor; a laser source configured to emit a coherent light beam; a spatial light modulator operatively coupled to the digital signal processor and configured to modulate said coherent light beam, wherein the spatial light modulator is configured to phase conjugate an interference pattern of a DVE medium that is positioned between said spatial light modulator and a target, and wherein the LIDAR system is configured to direct the coherent light beam toward the target such that the coherent light beam reflects off of the DVE medium to yield scattered photons and reflects off of the target to yield reflected photons; and a detector array operatively coupled to the digital signal processor and configured to detect the scattered photons and the reflected photons, wherein the digital signal processor is configured to track a position and pose of the aerial vehicle as the aerial vehicle navigates through the DVE medium.

In certain aspects, the digital signal processor is configured to communicate with a flight control system of the aerial vehicle.

In certain aspects, the digital signal processor is configured to track the position and pose based at least in part on information received from the flight control system.

In certain aspects, the LIDAR system is configured to iteratively scan a plurality of conjugates to identify a current scattering state of said DVE medium.

In certain aspects, the LIDAR iteratively scans all possible conjugates to identify a current scattering state of said DVE medium.

In certain aspects, the step for iteratively scanning the plurality of conjugates uses a Fienup reconstruction technique.

In certain aspects, the LIDAR system is configured to probe at successively longer presumed ranges until a predetermined time for a scan exceeds a decorrelation time of said DVE medium at a presumed distance.

In certain aspects, the laser source is configured to emit the coherent light beam via an optical phase array.

In certain aspects, the detector array is a single photon avalanche diode (SPAD) array.

In certain aspects, the flight control system is configured to identify a landing zone as a function of data received from the LIDAR system via the digital signal processor.

DRAWINGS

These and other advantages of the present disclosure may be readily understood with the reference to the following specifications and attached drawings wherein.

DESCRIPTION

Figure 1:
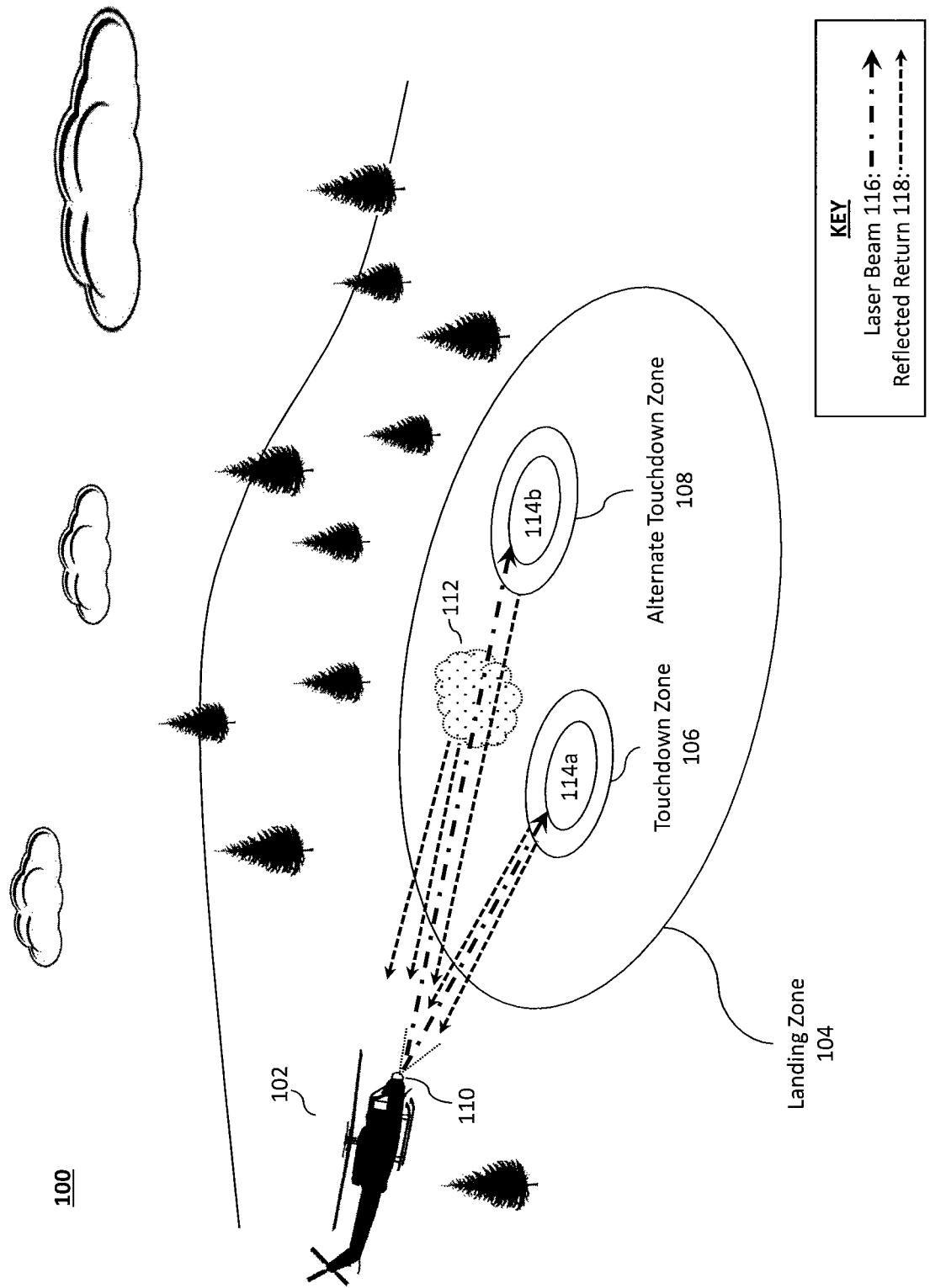
FIG. 1 illustrates an aerial system having an aerial vehicle equipped with a LIDAR system.

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments. For this disclosure, the following terms and definitions shall apply.

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, the terms "aerial vehicle" and "aircraft" refer to a machine capable of flight, including, but not limited to, both traditional runway and vertical takeoff and landing ("VTOL") aircraft. VTOL aircraft may include fixed-wing aircraft (e.g., Harrier jets), rotorcraft (e.g., helicopters), and/or tilt-rotor/tilt-wing aircraft.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

As used herein, the terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

As used herein, the term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

As used herein, the term "network" as used herein includes both networks and inter-networks of all kinds, including the Internet, and is not limited to any particular network or inter-network.

As used herein, the term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

With reference to FIG. 1, a LIDAR system, such as the disclosed DVE-resistant LIDAR system 110, may be used to navigate an aerial vehicle 102 and to identify one or more targets 114 (e.g., targets 114a, 114b). Improving the accuracy of the LIDAR systems in a DVE increases the safety and accuracy of aerial-vehicle operation. Existing LIDAR systems can saturate its receiver when subject to a reflected return 118 that is backscattered by DVE media 112 (e.g., scattering media or scatterers), thereby reducing the accuracy of the LIDAR system while making it difficult to control and/or navigate the aerial vehicle 102. For example, if a traditional LIDAR system were to aim a laser beam 116 (or another coherent light beam) at alternate touchdown zone 108, the DVE media 112 would result in backscatter of the reflected return 118, which could render the reflected return 118 inaccurate and/or undetected. The DVE media 112 may be, for example, rain, dust, heavy pollution, fog, etc. Traditional LIDAR systems attempt to address (or otherwise mitigate) this backscatter from DVE media 112 by performing adaptive gain control to maximize the perceived target returns, while minimizing the gain applied to backscatter returns; however, this adaptive gain control is difficult to accomplish in real time to allow for effective use of the LIDAR system in flight critical situations, such as landing and collision avoidance.

To provide for real-time operation, a LIDAR system may include a light focusing through degraded visual environment (LIFT-DVE) system and/or functionality to yield the DVE-resistant LIDAR system 110, thereby enabling improved autonomous and/or controlled flight operations. The DVE-resistant LIDAR system 110 mitigates DVE effect on its LIDAR components (e.g., the detector) by, inter alia, mitigating noise level from backscattering of the reflected return 118 on the LIDAR detector cause by DVE media 112 and/or other obstructions. Generally speaking, the DVE-resistant LIDAR system 110 is designed to make LIDAR adjustments that overcome DVE automatically. By compensating for a DVE, the operating envelope of an autonomous flight vehicle can be expanded, while the operator of a non-autonomous vehicle can obtain better sensor information regarding the surroundings. The DVE-resistant LIDAR system 110 is particularly advantageous in landing scenarios where the aerial vehicle 102 is tracking ground targets 114, but may be configured for and applied to all phases of flight, especially flight paths that require object or terrain avoidance in DVE situations.

The DVE-resistant LIDAR system 110 provides a LIDAR with spatial light modulator (SLM) that changes or corrects a transmitted laser beam 116 based at least in part on the detection of backscatter from a target 114 and the backscatter detected from the DVE media 112. That is, the SLM can be tuned by the DVE-resistant LIDAR system 110 to cancel out the anticipated backscatter returns from the DVE by separately characterizing the backscatter from the DVE media 112 and the backscatter from the target 114. In operation, the DVE-resistant LIDAR system 110 uses a sensor (e.g., a LIDAR detector) to detect a returned LIDAR signal from both the DVE media 112 as well as the target 114. The DVE-resistant LIDAR system 110 may then determine a wavefront correction that can be applied to the laser beam 116 to minimize effects of backscattering. Based on this information, the DVE-resistant LIDAR system 110 uses a spatial light modulator (SLM) to change or modify the profile (e.g., wavefront) of the laser beam 116 and maximize the ground returns while minimizing backscattering. The DVE-resistant LIDAR system 110 may continuously (e.g., dynamically; in real time or near-real time) update the transmission matrix of the scattering media, performs phase reversal, and updates to maximize target returns as conditions change.

The DVE-resistant LIDAR system 110 may be installed in or on an autonomous aerial vehicle 102 to improve performance during a DVE condition or a manned aerial vehicle 102 (e.g., a crewed aircraft) to improve visibility for the aircrew. The DVE-resistant LIDAR system 110 may be integrated with the aerial vehicle 102 as a sensor package (e.g., a sensor payload/sensor suite, which may further include a processor and/or other supporting hardware). The DVE-resistant LIDAR system 110 and/or sensor package may be moveably coupled to the aerial vehicle 102 via, for example, a gimbal or other structure configure to aim/direct the LIDAR system toward a target 114. In operation, the DVE-resistant LIDAR system 110 aims (e.g., via a gimbal) a laser beam 116 or another coherent light beam at a target 114 and measures the reflected return 118 to determine distance between the DVE-resistant LIDAR system 110 and that target 114. While the aerial vehicle 102 is illustrated as a VTOL aerial vehicle (e.g., a helicopter), the aerial vehicle 102 may be a different configuration, such as, for example a fixed-wing aircraft.

The targets 114 may be threats, obstacles, and/or touchdown zones (e.g., a primary touchdown zone 106, alternative touchdown zone 108, or an unspecified area to scan for a suitable touchdown zone, etc.) for the aerial vehicle 102 to land within a landing zone 104; whether a prepared touchdown zone (e.g., a runway, helipad, etc.) or an unprepared touchdown zone (e.g., natural terrain or ground, a field, a body of water, etc.). For example, the aerial vehicle 102 may, in operation, autonomously detect and execute an aerial-vehicle landing at an unprepared touchdown zone based at least in part on data from the DVE-resistant LIDAR system 110, while simultaneously negotiating and navigating threats and obstacles (e.g., vegetation, terrain, buildings, etc.). In other words, LIDAR scanning (via DVE-resistant LIDAR system 110) may be employed to survey the ground (or other terrain) to locate a suitable touchdown zone 106, 108, to detect objects/obstacles, to survey terrain, mapping, autonomous flight, object detection/tracking etc. For example, during LIDAR scanning, the DVE-resistant LIDAR system 110 may aim a laser beam 116 at a target 114a (i.e., touchdown zone 106) and receive an unobstructed reflected return 118, which may be used to assess the touchdown zone 106. Alternatively, the DVE-resistant LIDAR system 110 may aim a laser beam 116 at a target 114b (i.e., alternate touchdown zone 108) through DVE media 112 and receive an obstructed reflected return 118, which may be processed using the LIFT-DVE system and/or associated techniques disclosed herein.

Figure 2A:
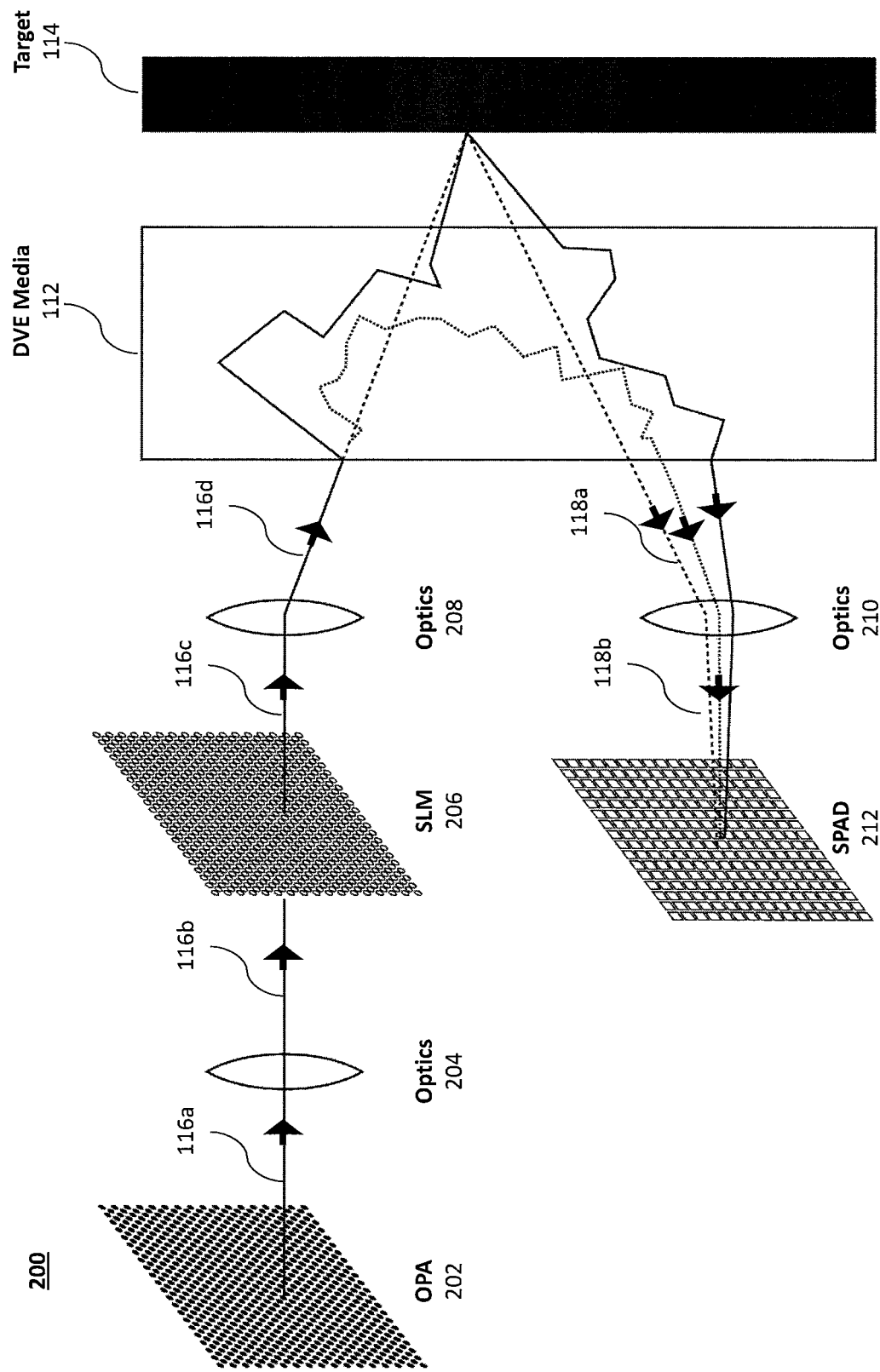
FIG. 2a illustrates an example optical path for an example LIDAR system.

FIG. 2a illustrates an example optical path of an optical system 200 for the DVE-resistant LIDAR system 110 to provide a longer range in a DVE. To transmit a laser beam 116 toward a target 114 through DVE media 112 and back as a reflected return 118, the optical system 200 generally comprises a laser light source 201, an optical phase array (OPA) 202, first optics 204, an SLM 206, second optics 208, third optics 210, and a single photon avalanche diode (SPAD) array 212. Each of the first, second, and third optics 204, 208, 210 may comprise one or more lenses to focus, adjust, split, and/or otherwise manipulate light passing therethrough. In an illustrative embodiment, the laser light source 201 and the OPA 202 generate a laser beam 116, which may be modified by an optical SLM 206. For example, the SLM 206 can modify the laser beam 116 profile to correct and/or account for DVE media 112. To correct and/or account for DVE media 112, the phase modulation on the SLM 206 is tied to the received photon energy on the detector (e.g., the SPAD array 212) that is attributed to the DVE media 112. As backscattering photon energy from DVE is received, the SLM 206 modifies the laser beam 116 to the point of minimum DVE backscatter from the DVE media 112.

Starting at the upper left of the optical system 200, the OPA 202 outputs a laser beam 116a, which is filtered by first optics 204 to yield a filtered laser beam 116b. The SLM 206 is used to modulate the filtered laser beam 116b with a series of patterns defined by a matrix of binary switching elements, thereby yielding a modulated laser beam 116c. Adding a spatial light modulator (SLM) to the LIDAR enables the LIDAR system 110 system to tune the profile of the emitted light precisely, thereby canceling out the backscatter from the medium. As the light sensor is co-located with the emitter, the scattering media can be modeled as a 2D matrix, M. By iteratively modulating the SLM 206, the scattering matrix M can be determined, and the SLM 206 can modify the emitted light into a mode that gives the phase conjugate of the medium backscatter component at LIDAR a particular focal distance in the DVE using the properties of coherence, similar to optical coherence tomography (OCT).

Second optics 208 filter the modulated laser beam 116c to yield a filtered modulated laser beam 116d. At this point, the filtered modulated laser beam 116d exits the LIDAR unit and enters the DVE media 112. The DVE media 112 may comprise, for example, a mixture of air and scattering elements (e.g., molecules, particles, etc.) that cause the laser beam 116 (e.g., the filtered modulated laser beam 116d) to be scattered before returning to the third optics 210 as reflected return 118. Even in the presence of DVE media 112, a fraction of the transmitted laser beam 116 (e.g., the filtered modulated laser beam 116d) will reach the target 114 and return to third optics 210 as a return beam 118a. The return beam 118a passes to the detector (e.g., the SPAD array 212) through the third optics 210 as the reflected return 118b.

Figure 2B:
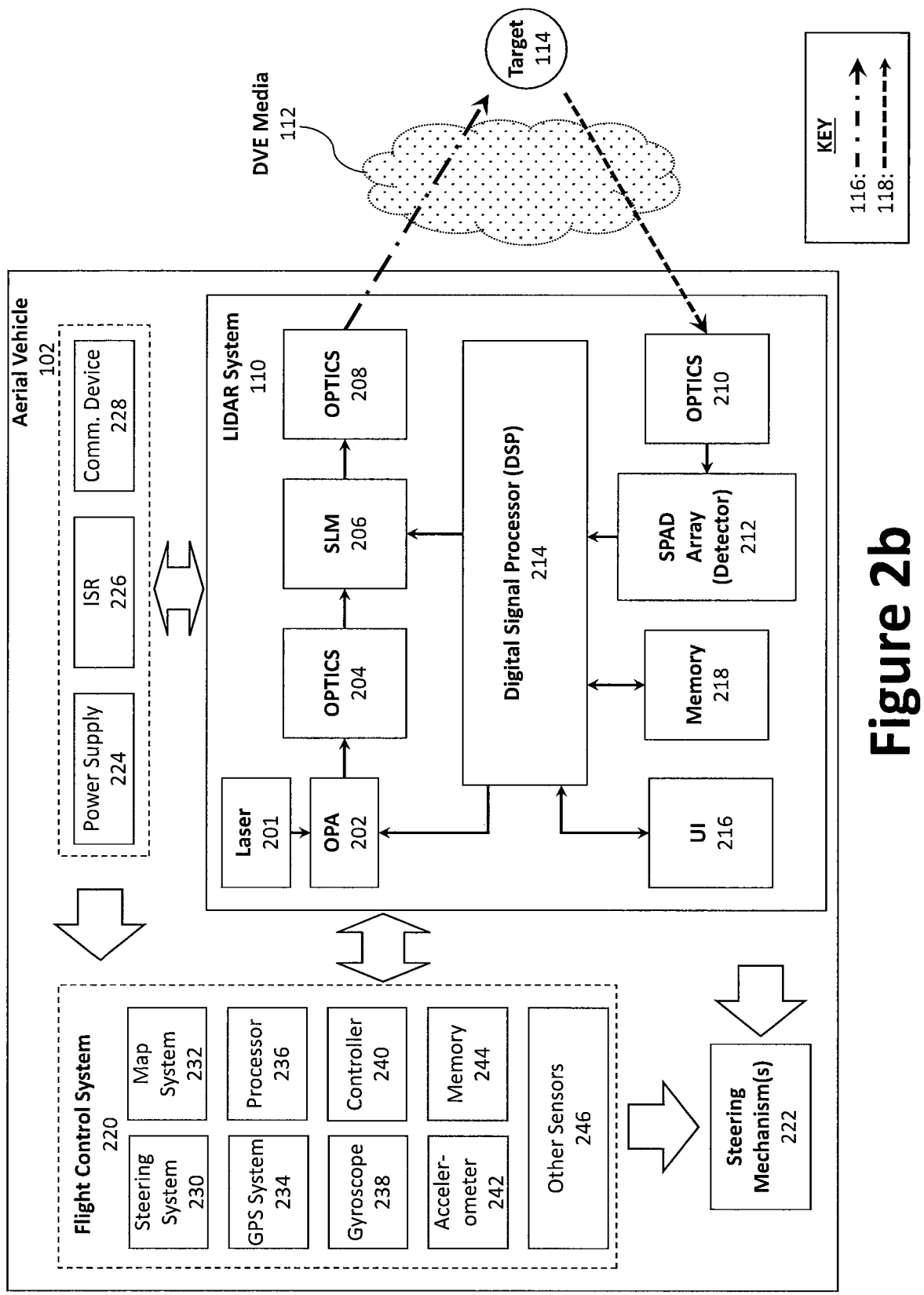
FIG. 2b illustrates a block diagram of a system architecture for an example LIDAR system.

FIG. 2b illustrates a block diagram of the DVE-resistant LIDAR system 110 relative to other components of an example aerial vehicle 102. As illustrated, the various components of the DVE-resistant LIDAR system 110 may be connected to, or incorporated with, a system of the aircraft or another computer system. For example, the LIDAR system 110 may be operatively coupled with, whether directly or indirectly, a flight control system 220, one or more steering mechanisms 222, a power supply 224, ISR payload 226, a communication device 228, etc.

The DVE-resistant LIDAR system 110 may be operatively coupled with a processor, whether a remote processor or a local processor. For example, the OPA 202, the SLM 206, and the SPAD array 212 may be operatively coupled with a digital signal processor (DSP) 214. The DSP 214 may, in turn, be operatively coupled with a memory device 218 and a user interface 216, as well as other systems, such as the flight control system 220. In operation, the DSP 214 interprets data received from the SPAD array 212 associated with the reflected return 118 to determine the returned LIDAR signal and backscattering. The DSP 214 then optimizes the SLM 206 to reduce the detected DVE backscattering.

The laser light source 201 may be a conventional laser source useful for LIDAR applications that emits a laser beam 116 via the OPA 202. The laser beam 116 may by pulsed at regular, controlled intervals under the control of the DSP 214. The DSP 214 may also control SLM 206, which may be used to create an interference pattern under digital control from the DSP 214 of a N×M scattering matrix of controllable binary elements. The SLM 206 and pulsing laser beam 116 combination should provide a sufficiently high resolution to create a phase conjugate that will cancel the backscatter pattern from the DVE media 112, but that can be iterated through the set of possible conjugates fast enough that a cancelling phase conjugate can be found for a given target depth before the DVE media 112 decorrelates or changes and the process is repeated.

A greater number of additional photons will reach the SPAD array 212 after reaching the target 114, but being scattered by the DVE media 112. In a DVE, the largest number of photons will be received after being scattered by the DVE media 112 without reaching the target 114. By scanning the SLM 206 across the available modulation, there will be a best fit phase conjugate of the backscatter generated by the DVE media 112 that will leave the photons directly reflected by the target 114 at a given depth of focus, if the target 114 is there and the moving particles in the DVE media 112 do not decorrelate with the best fit SLM modulation before the SLM 206 can complete a scan. A peak can be detected and associated with finding the target 114 at the direct path photon depth of focus, which can be repeated at that depth over the surrounding area, expanding the areal coverage around the target point.

The DVE-resistant LIDAR system 110 system may employ a method of tracking the position and pose of the vehicle as it moves through the scattering media and detects objects in the background. If no target backscatter is detected at a particular distance from the emitter-detector pair within the DVE media 112, the process can then be repeated up to multiple ranges and sampling rate limits of the DVE-resistant LIDAR system 110. This process enables the LIDAR to detect a target at a greater range in DVE than currently possible. As the aerial vehicle 102 moves through the DVE media 112, the scattering layer is peeled back to reveal the remaining scattering media and new scattering matrix, M'. In one aspect, a suitable resolution for the SLM 206 may be, for example, at least 4160×2464, which may be placed between a 1.5 micron wavelength, pulsed laser and the emitting optics. The iteration may be performed on an embedded platform using algorithms, such as a Fienup reconstruction or machine learning based nonlinear beam propagation method, but further including the vehicle position and pose in the software algorithm, which are described in connection with FIGS. 4 and 5. Decorrelation times are dependent on the opacity of the DVE media 112 and the total distance through the DVE media 112 that is sought to be penetrated. The SPAD array 212 acts as a detector and feeds information into the embedded platform (e.g., DSP 214), which calculates the inverse propagation and modifies the phase profile on the SLM 206.

Optics 204 assist with focusing and correlating the laser beam 116 from the OPA 202. Optics 204 may include a beam splitter for creating a reference beam to which returned reflected light (e.g., reflected return 118) can be compared. Optics 208 directs and focuses the laser beam 116 from the SLM 206 into the DVE media 112, where the target 114 sought is in (or beyond) the DVE media 112 at an unknown distance.

Reflected photons from the target 114 and the DVE media 112 return to the DVE-resistant LIDAR system 110 through focusing optics 210, which directs the gathered light energy to the SPAD array 212. DSP 214 processes the signal received from SPAD array 212 in view of the current state of SLM 206 and scans through a series of proposed ranges to target 114 to determine whether a successful conjugation of the scattering properties of the DVE media 112 has been achieved that allows for a determination that the target 114 has been located or identified. The memory device 218, which is operatively coupled with the DSP 214, may be used to store the algorithms for conjugation of the transmitted beam and the resulting patterns detected. In certain aspects, the algorithms may be based on either Fienup algorithms or machine-learning algorithms based beam propagation methods, which may incorporate the vehicle position and pose into determining the scattering matrix M continuously. Alternatively, the low-level conjugation math may be hard-wired into a custom application-specific integrated circuit (ASIC) as hard-connected digital logic to speed processing times and conserve chip area.

In certain aspects, the DVE-resistant LIDAR system 110 can be provided with a user interface 216 (e.g., a human-machine interface (HMI)) that communicates with and provides information to the operator or monitor that quantifies the degree of scattering caused by the DVE media 112 and provides visual and/or audible cues to the operator or a monitor (or monitoring system), particularly in landing zones. The user interface 216 can be incorporated into the aerial vehicle 102 itself, a portable user device (e.g., a tablet computer, laptop computer, smart phone, etc.), or a remote operations/control center. The user interface 216 may allow for the control of the DVE-resistant LIDAR system 110, including activating a DVE mode (instructing to the DVE-resistant LIDAR system 110 to employ the LIFT-DVE system and methods), displaying range to a target 114 results and/or warnings that the target 114 is not detected, and setting the limits of the hardware's search for a target 114 in a DVE. The user interface 216 is useful for setting the mode of the DVE-resistant LIDAR system 110. For example, the LIDAR can report on its success or failure in probing the DVE media 112 and the decorrelation time of the DVE media 112, which gives an assessment of the thickness, depth, or severity of the DVE media 112. The operator can set the DVE-resistant LIDAR system 110, via the user interface 216, for a particular type of DVE media 112, which may range from the most opaque to least opaque environments, for example, so that the LIDAR does not attempt to create a larger or sharper visualization than the optics are capable of resolving in a particular type of DVE. The user interface 216 may also report on the state of the hardware (e.g., of the DVE-resistant LIDAR system 110), how old the last accurate ranging measurement is relative to the movement of the vehicle and the extent to which the inertial movement of the aerial vehicle 102 exceeds limits of safety given the last known range to the target in the DVE media 112.

The steering mechanism 222 may be configured to steer the aerial vehicle 102 (whether autonomously or under manned control) on a navigational path to accomplish a mission (e.g., maneuver towards a target 114) or to perform emergency maneuvers (e.g., avoid an obstacle). In one aspect, the steering mechanism 222 responds to signals from the flight control system 220, which may employ feedback or other control systems to accurately direct the aerial vehicle 102 along an intended route. In relation to VTOL aerial vehicles, the steering mechanism 222 may include, for example, a number of rotors (e.g., fans or rotors with helicopters blades), which may be fixed rotors or steerable rotors, along with airfoils and other control surfaces. For other aerial vehicles, such as a fixed-wing aerial vehicle, the steering mechanism 222 may include rudders, elevators, flaps, ailerons, spoilers, air brakes, and other control surfaces. For example, rudders at the rear of the aerial vehicle 102, as well as elevators, and any other suitable control surfaces for vertical flight vehicles, along with associated wires, cables, actuators, and so forth. The steering mechanism 222 may also include articulated, electric motors employing vectored-thrust control to change the thrust vector directly. The steering mechanism 222 may also, or instead, include any mechanism for steering an aerial vehicle 102.

The flight control system 220 may determine one or more navigational paths (e.g., generating multiple waypoints) for the aerial vehicle 102 to reach a desired location based upon signals received from the components of a navigation system. The flight control system 220 may calculate, generate, and send navigation commands (e.g., data signals) to the steering mechanism 222 to direct the aerial vehicle 102 along a navigational path to the desired location. The flight control system 220 may be disposed wholly or partially inside a separate housing, inside the airframe, or some combination thereof. The flight control system 220, which may use information from the DVE-resistant LIDAR system 110, is generally configured to direct, or otherwise control, one or more steering mechanisms 222 within an aerial vehicle 102. The flight control system 220 may be coupled in a communicating relationship with the aerial vehicle 102 and a remote location and may be configured to send and receive signals between the aerial vehicle 102 and the remote location via communication device 228. Communication device 228 may be, for instance, a wireless transceiver and antenna. In some aspect, one or more flight control system 220 may be utilized to accommodate communication among multiple aerial vehicles.

In one example, the flight control system 220 may include a steering system 230, a map system 232, a navigation system (e.g., a GPS system 234, an inertial measurement unit (IMU) and/or inertial navigation system (INS)), a flight control processor 236, a gyroscope 238, a flight controller 240, an accelerometer 242, and/or a memory device 244. The flight control system 220 may also include the components described above as being disposed within the DVE-resistant LIDAR system 110, as well as other sensors 246, such as any other conventional flight instrumentation, sensors, processing circuitry, communications circuitry, optical system including cameras and the like, necessary or useful for operation of an unmanned aerial vehicle or other autonomously or manually piloted vehicle.

The flight control system 220 may be communicatively coupled with the one or more steering mechanisms 222 and/or the DVE-resistant LIDAR system 110. For instance, the steering system 230 may be configured to receive signals from the flight control system 220 (or DVE-resistant LIDAR system 110) and provide suitable control signals to the steering mechanism 222 of the vehicle in order to direct the aerial vehicle 102 along an intended route.

The map system 232 may be part of a map-based flight control system that provides positional information about natural and manmade features within an area. This may include information at any level of detail including, e.g., topographical maps, general two-dimensional maps identifying roads, buildings, rivers, and the like, or detailed, three-dimensional data characterizing the height and shape of various natural and manmade obstructions such as trees, sculptures, utility infrastructure, buildings, and so forth. In one aspect, the map system 232 may cooperate with an optical system for visual verification of surrounding context or the map system 232 may cooperate with the GPS system 234 to provide information on various obstacles within an environment for purposes of path determination or the like. In one aspect, the map system 232 may provide a supplemental navigational aid in a GPS-denied or GPS-impaired environment. When GPS is partially or wholly absent, the map system 232 may cooperate with the DVE-resistant LIDAR system 110 and/or other sensors 246, such as optical sensors, inertial sensors, and so forth to provide positional information until a GPS signal can be recovered.

The map system 232 may more generally communicate with other components of the flight control system 220 in order to support navigation of a vehicle as contemplated herein. For example, the map system 232 may provide a map-based navigation system that stores a map of an operating environment including one or more objects. The map-based navigation system may be coupled to cameras and configured to determine a position of a vehicle by comparing stored objects to a visible environment, which may provide position data in the absence of GPS data or other positional information.

The GPS system 234 may be part of a global positioning system configured to determine a position of the aerial vehicle 102. The GPS system 234 may include any GPS technology known in the art or that will become known in the art, including conventional, satellite-based systems as well as other systems using publicly or privately operated beacons, positional signals, and the like. The GPS system 234 may include one or more transceivers that detect data for use in calculating a location. The GPS system 234 may cooperate with the other components of the flight control system 220 to control operation of the aerial vehicle 102 and navigate the vehicle along an intended path.

The gyroscope 238 may be a device configured to detect rotation of the aerial vehicle 102 or a surface to which the gyroscope 238 is coupled (e.g., a portion of the DVE-resistant LIDAR system 110). The gyroscope 238 may be integral with the aerial vehicle 102 or it may be disposed outside of the aerial vehicle 102. The gyroscope 238 may include any gyroscope or variations thereof (e.g., gyrostat, microelectromechanical systems ("MEMS"), fiber-optic gyroscope, vibrating-structure gyroscope, dynamically tuned gyroscope, and the like) known in the art or that will become known in the art. The gyroscope 238 may cooperate with the other components of the flight control system 220 to control operation of the aerial vehicle 102 and navigate the vehicle along an intended path.

The accelerometer 242 may be any device configured to detect a linear motion of the aerial vehicle 102. The accelerometer 242 may be integral with the aerial vehicle 102 or it may be disposed inside or outside of the aerial vehicle 102. The accelerometer 242 may include may include any accelerometer known in the art (e.g., capacitive, resistive, spring-mass base, direct current ("DC") response, electromechanical servo, laser, magnetic induction, piezoelectric, optical, low frequency, pendulous integrating gyroscopic accelerometer, resonance, strain gauge, surface acoustic wave, MEMS, thermal, vacuum diode, and the like) or that will become known in the art. The accelerometer 242 may cooperate with the other components of the flight control system 220 to control operation of the aerial vehicle 102 and navigate the vehicle along an intended path.

Other sensors (or sensor systems) 246 may also be similarly employed. For example, the aerial vehicle 102 (or the flight control system 220, DVE-resistant LIDAR system 110, etc.) may employ infrared sensors, RADAR (i.e., RAdio Detection And Ranging) sensors, and so forth.

The flight control processor 236 may be coupled in a communicating relationship with the flight controller 240, the aerial vehicle 102, the flight control system 220, the steering mechanism 222, and the other various other components, systems, and subsystems described herein, such as the DSP 214 of the DVE-resistant LIDAR system 110. The flight control processor 236 may be an internal processor of the aerial vehicle 102 or the flight control system 220, an additional processor to support the various functions contemplated herein, a processor of a desktop computer or the like, locally or remotely coupled to the aerial vehicle 102, and the flight control system 220, a server or other processor coupled to the aerial vehicle 102 and the flight control system 220 through a data network, or any other processor or processing circuitry. In general, the flight control processor 236 may be configured to control operation of the aerial vehicle 102 or the flight control system 220 and perform various processing and calculation functions to support navigation. The flight control processor 236 may include a number of different processors cooperating to perform the steps described herein, such as where an internal processor of the aerial vehicle 102 controls operation of the aerial vehicle 102 while a processor in the housing preprocesses optical and echolocation data.

The flight control processor 236 may be configured to determine or revise a navigational path for the aerial vehicle 102 to a location based upon a variety of inputs including, e.g., position information, movement information, data from the DVE-resistant LIDAR system 110, and so forth, which may be variously based on data from the GPS system 234, the map system 232, the gyroscope 238, the accelerometer 242, and any other navigation inputs, as well as an optical system and the echolocation system, which may provide information on obstacles in an environment around the aerial vehicle 102. An initial path may be determined, for example, based solely on positional information provided by the GPS system 234, with in-flight adjustments based on movements detected by the gyroscope 238, accelerometer 242, and the like. The flight control processor 236 may also be configured to utilize an optical navigation system, where the processor is configured to identify a visible obstacle within the FOV of an optical system; for example, using optical flow to process a sequence of images and to preempt the GPS system 234 to navigate the aerial vehicle 102 around visible obstacles and toward the location. The flight control processor 236 may be further configured to identify an obstacle within the FOV of the DVE-resistant LIDAR system 110 or ISR payload 226, usually within a line of flight of the vehicle, and further configured to preempt the GPS system 234 and the optical navigation system to execute a responsive maneuver that directs the aerial vehicle 102 around the obstacle and returns the aerial vehicle 102 to a previous course toward the location.

The flight controller 240 may be operable to control components of the aerial vehicle 102 and the flight control system 220, such as the steering mechanism 222. The flight controller 240 may be electrically or otherwise coupled in a communicating relationship with the flight control processor 236, the aerial vehicle 102, the flight control system 220, the steering mechanism 222, and the other various components of the devices and systems described herein. The flight controller 240 may include any combination of software and/or processing circuitry suitable for controlling the various components of the aerial vehicle 102 and the flight control system 220 described herein, including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the aerial vehicle 102 and the flight control system 220, such as an on-board processor. In another aspect, this may be a processor, such as the flight control processor 236 described herein, which may be associated with a personal computer or other computing device coupled to the aerial vehicle 102 and the flight control system 220, e.g., through a wired or wireless connection. Similarly, various functions described herein may be allocated among an on-board processor for the aerial vehicle 102, the flight control system 220, and a separate computer. All such computing devices and environments are intended to fall within the meaning of the term "controller" or "processor" as used herein, unless a different meaning is explicitly provided or otherwise clear from the context.

The memory devices 218, 244 may include local memory or a remote storage device that stores a log of data for the flight control system 220 and/or the DVE-resistant LIDAR system 110, including, without limitation, the location of sensed obstacles, maps, images, orientations, speeds, navigational paths, steering specifications, GPS coordinates, sensor readings, and the like. The memory devices 218, 244 may also, or instead, store sensor data from the ISR payload 226 and/or the DVE-resistant LIDAR system 110, related metadata, and the like. Data stored in the memory device 244 may be accessed by the flight control processor 236, the flight controller 240, the DVE-resistant LIDAR system 110, a remote processing resource, and the like.

In operation, the DVE-resistant LIDAR system 110 may transmit a signal while operating in the DVE that returns primarily backscatter from the DVE media 112. This return is used to phase conjugate the SLM 206 to tune out the interfering backscatter from the media. As the target 114 comes within range, the backscatter characteristics of the target 114 will appear in the received signal, but the backscatter of the target 114 will have different properties than the previously detected media of the DVE. The system will continue to phase conjugate the SLM 206 with the medial backscatter signal to maximize the signal of the target 114, thus allowing detection of the target 114 backscatter at a range greater than is possible with other current techniques. If no target 114 is detected even at the optimized SLM modulation, the LIDAR probes to the next increment of range and repeats, until either the target 114 is acquired or the limits of the LIDAR of the described system is detected.

Initial DVE backscatter phase conjugate corrections may be pre-loaded in the system (e.g., stored to memory device 218), which may comprise separate initial SLM corrections for different common DVE conditions such as rain, fog, smoke, or dust. These SLM corrections may incorporate a pre-learned database of different operational conditions using convolutional neural networks which model the optical transmission matrix. DVE backscatter corrections can be sampled in real time by measuring backscatter to a predetermined range that is known to be free of the target 114. The DVE backscatter correction may be iterated from near ranges to distant ranges until a change in the property of the backscatter is detected that indicates that the DVE media 112 has changed. In certain aspects, the DVE backscatter correction sampling is bounded to space that is known from a prior terrain map to contain free space.

Figure 3:
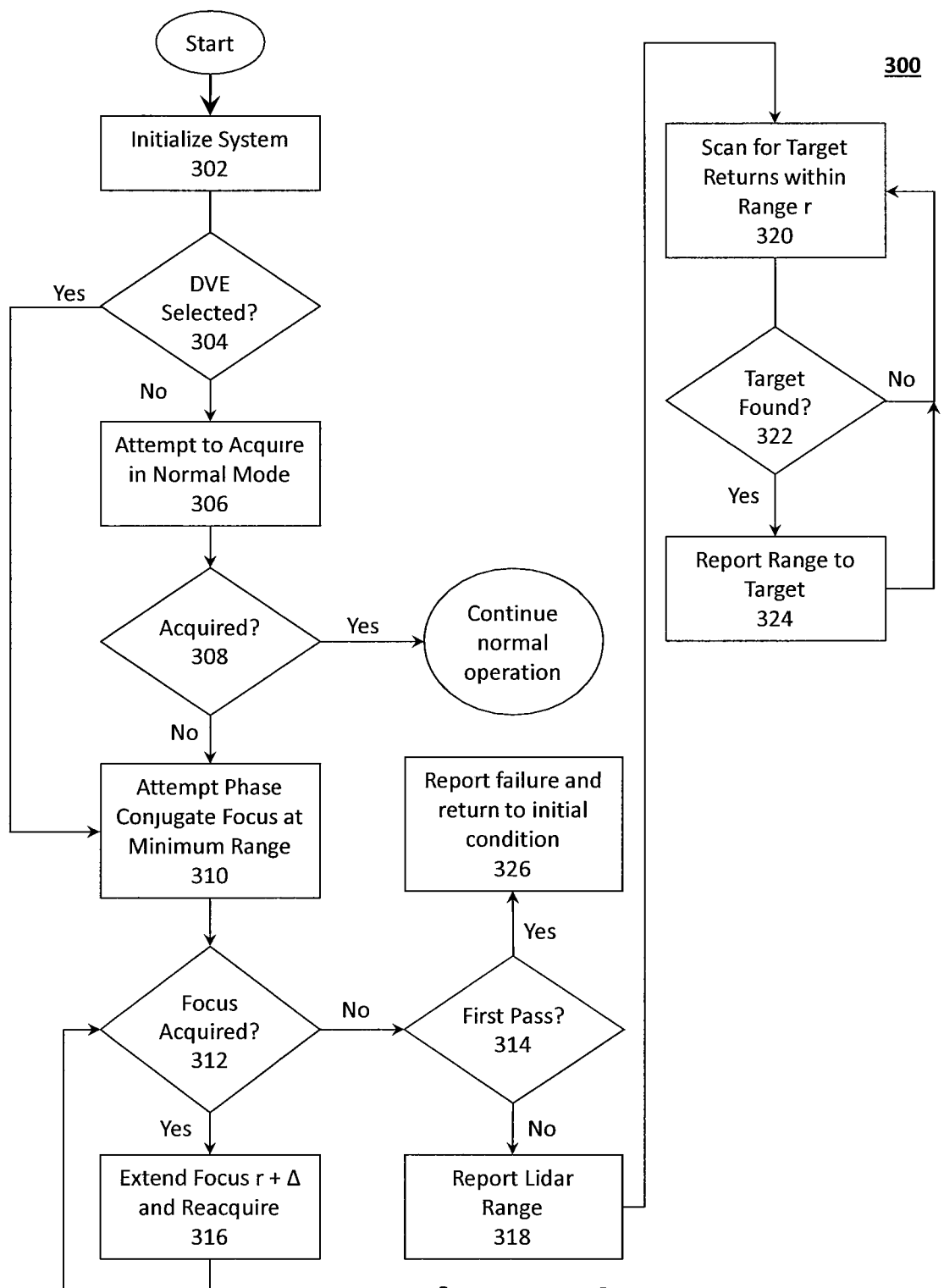
FIG. 3 illustrates a flowchart of an example method of operation for the DVE-resistant LIDAR system.

FIG. 3 shows a flowchart of an example method of operation 300 for the DVE-resistant LIDAR system 110. The method 300 iterates a search, starting with the minimum range at which the DVE media 231 could be meaningfully correlated and a conjugate generated. The DVE-resistant LIDAR system 110 is initialized at step 302 to starting parameters for normal, non-DVE operation as in a conventional LIDAR. Then, the DVE-resistant LIDAR system 110 checks, via DSP 214, to see if DVE mode is selected at step 304. If not, conventional operation continues as in steps 306 and 308. However, if DVE mode is selected or a range is not acquired in step 308, the DVE-resistant LIDAR system 110 will attempt to acquire a range in DVE mode by first, looking for a phase conjugate that generates a return at the minimum effective range of the system in step 310. If a conjugation is successful at that distance as tested at step 312, the system will increment the range and attempt conjugation again in step 316. When conjugation fails, that determines the maximum depth of penetration achievable in the current DVE. If the scan fails at 312 and it is the first pass 314, then the system is unable to locate a target 114 at all and the method reverts to the initial conditions, at which point the method of operation 300 may report failure and return to initial condition at step 326. Otherwise, the last successful conjugation distance is reported as the current effective range of the LIDAR at step 318. The method 300 then scans for a reflected return 118 from target 114 within that effective range envelope in step 320. If a target is found at step 322, the DVE-resistant LIDAR system 110 reports that range out at step 324. If no target is found, the process can repeat with step 320 for as long as the decorrelation window for the DVE remains open. However, decorrelation times are expected to be short relative to the need for a new range update, so for moving vehicles the process will generally repeat with step 310 at the expiration of a decorrelation window.

Figure 4:
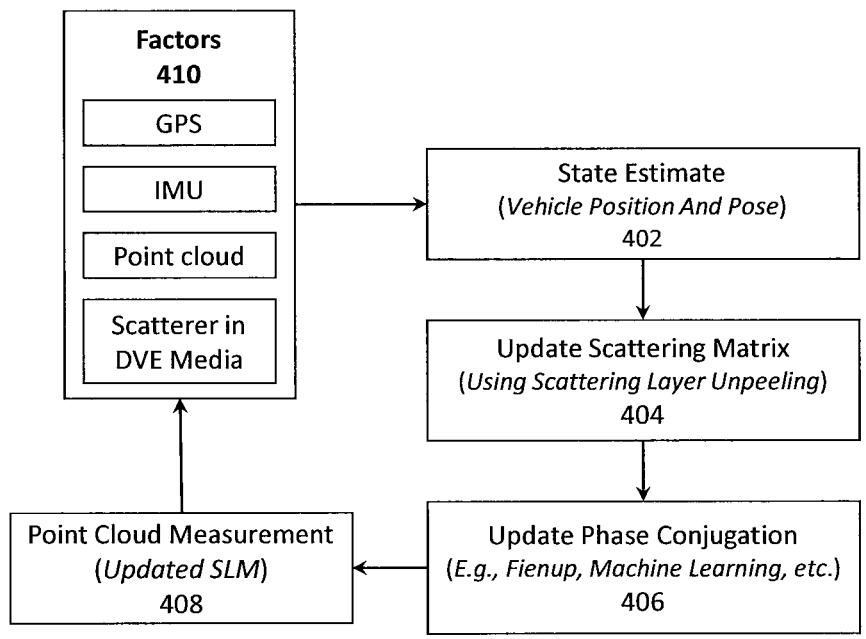
FIG. 4 illustrates a block diagram for determining a state estimate of an aerial vehicle.

With reference to FIG. 4, the DVE-resistant LIDAR system 110 may determine a state estimate of the aerial vehicle at step 402 via, for example, a processor (e.g., flight control processor 236, DSP 214, etc.). For example, the processor may determine the position and/or pose of the aerial vehicle 102 using one or more factors 410. The one or more factors 410 may include, for example GPS data, IMU data, point clouds, data related to the scatterers in the DVE media 112, etc. The factors 410 may be received from, for example, the flight control system 220, ISR payload 226, etc. At step 404, the scattering matrix is updated using, for example, scattering layer unpeeling (e.g., of the DVE media 112). At step 406, the phase conjugation is updated using, for example, Fienup reconstruction, machine learning, etc. At step 408, the point cloud measurement is used to update the SLM 206. The updated point cloud measurement may be stored at step 410 for future use.

Figure 5:
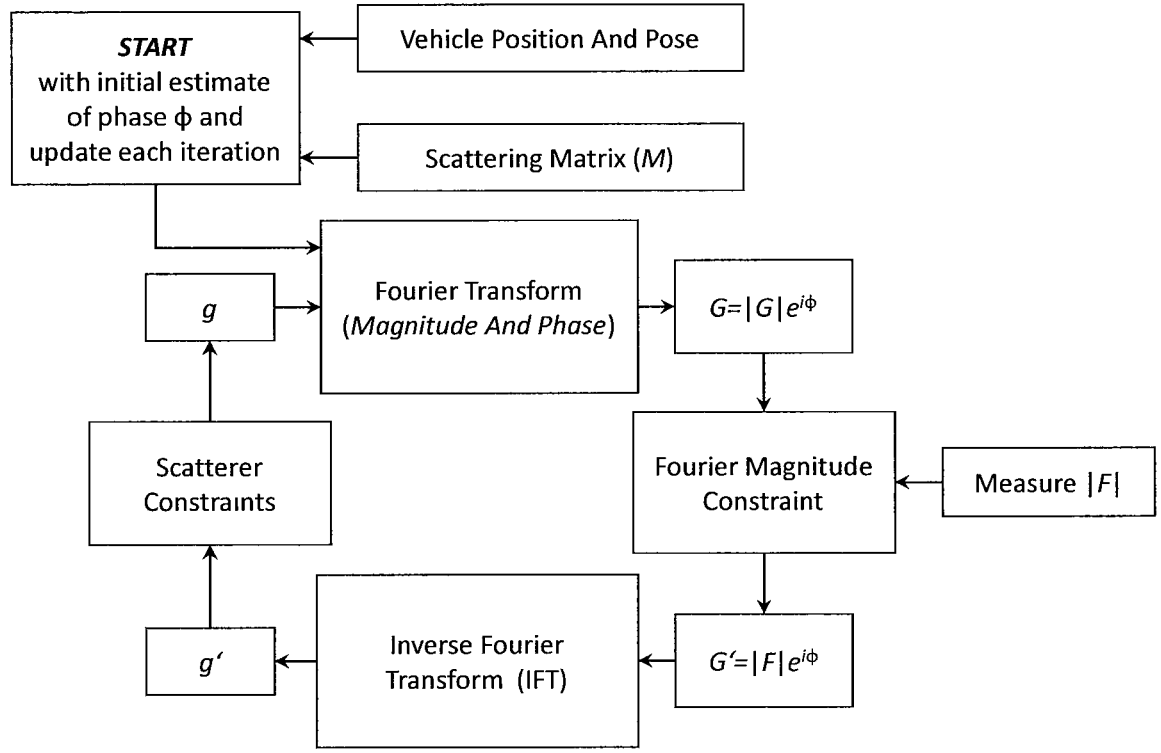
FIG. 5 illustrates an example block diagram of performing a Fienup reconstruction.

The DVE-resistant LIDAR system 110 may use phase retrieval algorithms and/or learning tomography. FIG. 5 illustrates an example block diagram of performing a Fienup reconstruction. For example, Fienup's phase retrieval is the process of algorithmically finding solutions to the phase problem. Given a complex signal F(k), of amplitude |F(k)|, and phase $\psi(k)$:

$$F(k)=|F(k)|e^{i\psi(k)}=\int_{-\infty}^{\infty}f(x)e^{-2\pi i k \cdot x}dx$$

where x is an M-dimensional spatial coordinate and k is an M-dimensional spatial frequency coordinate, phase retrieval consists in finding the phase that for a measured amplitude satisfies a set of constraints. In another example, learning tomography is used to generate a reconstruction model based on beam propagation method that takes multiple scattering into account.

The DVE-resistant LIDAR system 110 is particularly useful for autonomous landing of VTOL aerial vehicles in DVEs where the exact landing location is approximately known (but not precisely known) and higher energy methods of scanning for a non-visible surface, such as radar, are not desirable, for example because the emissions from a microwave landing system could be detected and attacked in a battlefield environment. An autonomous vertical lift vehicle may use the DVE-resistant LIDAR system 110 to fly to a roughly designated landing point, and then begin descending into the DVE using the LIDAR to detect the ground. Even in the presence of, for example, battlefield smoke, the DVE-resistant LIDAR system 110 allows the vehicle to detect the ground accurately at a sufficiently large distance that the vehicle can descend at a rate faster than it would if the vehicle had a higher uncertainty as to the point where the landing would take place. Higher descent rates, or descent when conventional optical approach guidance is not available at all, gives a vehicle equipped with the DVE-resistant LIDAR system 110 a capability and survivability advantage.

Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the invention may therefore be practiced otherwise than as specifically described above.

What is claimed is:

1. A LIDAR system for an aerial vehicle operating in a degraded visual environment (DVE), the LIDAR system comprising:

a digital signal processor;

a laser source configured to emit a coherent light beam;

a spatial light modulator coupled to the digital signal processor and configured to modulate said coherent light beam, wherein the spatial light modulator is configured to phase conjugate an interference pattern of a DVE medium that is positioned between said spatial light modulator and a target;

an optical lens configured to direct the coherent light beam from the spatial light modulator toward the target, wherein the coherent light beam reflects off of the DVE medium to yield scattered photons and reflects off of the target to yield reflected photons;

a second optical lens to collect the scattered photons and the reflected photons; and a detector array operatively coupled to the digital signal processor, wherein the detector array is configured to detect the scattered photons and the reflected photons, wherein the digital signal processor is configured to iteratively scan, starting at a range that is known to be free of the target, a plurality of conjugates to identify a current scattering property of said DVE medium.

2. The LIDAR system of claim 1, wherein the step for iteratively scanning the plurality of conjugates uses a Fienup reconstruction technique.

3. The LIDAR system of claim 1, wherein the LIDAR system is configured to probe at successively longer presumed ranges until a predetermined time for a scan exceeds a decorrelation time of said DVE medium at a presumed distance.

4. The LIDAR system of claim 1, wherein the laser source is configured to emit the coherent light beam via an optical phase array.

5. The LIDAR system of claim 1, wherein the detector array is a single photon avalanche diode (SPAD) array.

6. The LIDAR system of claim 1, wherein the digital signal processor is configured to communicate with a flight control system of the aerial vehicle.

7. The LIDAR system of claim 6, wherein the flight control system is configured to identify a landing zone as a function of data received from the LIDAR system via the digital signal processor.

8. The LIDAR system of claim 6, wherein the optical lens includes a beam splitter to create a reference beam to which the scattered photons or the reflected photons can be compared.

9. The LIDAR system of claim 6, wherein the digital signal processor is configured to track a position and pose of the aerial vehicle as the aerial vehicle navigates through the DVE medium.

10. The LIDAR system of claim 9, wherein the digital signal processor is configured to track the position and pose based at least in part on information received from the flight control system.

11. A method of operating a LIDAR system of an aerial vehicle operating in a degraded visual environment (DVE), the method comprising the steps of:

emitting a coherent light beam from a laser source;

modulating said coherent light beam via a spatial light modulator, wherein the spatial light modulator is configured to phase conjugate an interference pattern of a DVE medium that is positioned between said spatial light modulator and a target;

directing the coherent light beam from the spatial light modulator toward the target via an optical lens, wherein the coherent light beam reflects off of the DVE medium to yield scattered photons and reflects off of the target to yield reflected photons;

collecting the scattered photons and the reflected photons via a second optical lens;

detecting the scattered photons and the reflected photons via a detector array; and iteratively scanning, starting at a range that is known to be free of the target, a plurality of conjugates to identify a current scattering property of said DVE medium.

12. The method of claim 11, wherein the step for iteratively scanning the plurality of conjugates uses a Fienup reconstruction technique.

13. The method of claim 11, further comprising the step of probing at successively longer presumed ranges until a predetermined time for a scan exceeds a decorrelation time of said DVE medium at a presumed distance.

14. The method of claim 11, wherein the detector array and the spatial light modulator are each operatively coupled to a digital signal processor, wherein the digital signal processor is configured to communicate with a flight control system of the aerial vehicle.

15. The method of claim 14, further comprising the step of identifying a landing zone as a function of data received from the LIDAR system via the digital signal processor.

16. The method of claim 11, wherein the optical lens includes a beam splitter to create a reference beam and the method further comprises the step of comparing the reference beam to the scattered photons or the reflected photons.

17. The method of claim 11, further comprising the step of tracking a position and pose of the aerial vehicle as the aerial vehicle navigates through the DVE medium.

18. The LIDAR system of claim 1, wherein the step for iteratively scanning the plurality of conjugates uses machine learning.

19. The LIDAR system of claim 18, wherein the machine learning is based non-linear beam propagation.

20. A LIDAR system for an aerial vehicle operating in a degraded visual environment (DVE), the LIDAR system comprising:

a laser source configured to emit a coherent light beam towards a target;

a spatial light modulator coupled to a digital signal processor and configured to modulate said coherent light beam, wherein the spatial light modulator is configured to phase conjugate an interference pattern of a DVE medium that is positioned between said spatial light modulator and the target;

an optical lens configured to direct the coherent light beam from the spatial light modulator toward the target, wherein the coherent light beam reflects off of the DVE medium to yield scattered photons and reflects off of the target to yield reflected photons;

a second optical lens to collect the scattered photons and the reflected photons; and a detector array operatively coupled to the digital signal processor, wherein the detector array is configured to detect the scattered photons and the reflected photons, wherein the digital signal processor is configured to scan a plurality of conjugates, wherein the digital signal processor starts at a range that is known to be free of the target and iteratively increases the range until the target is detected.

* * * * *